(12) United States Patent
Shih et al.

(10) Patent No.: US 8,599,136 B2
(45) Date of Patent: Dec. 3, 2013

(54) COMBINATION MOUSE AND TOUCH INPUT DEVICE

(75) Inventors: Po-Jen Shih, Taipei (TW); Sue I. Chen, Taipei (TW)

(73) Assignee: Giga-Byte Technology Co., Ltd., New Taipei (TW)

( * ) Notice: Subject to any disclaimer, the term of this patent is extended or adjusted under 35 U.S.C. 154(b) by 478 days.

(21) Appl. No.: 12/871,319

(22) Filed: Aug. 30, 2010

(65) Prior Publication Data

US 2012/0050163 A1    Mar. 1, 2012

(51) Int. Cl.
  *G09G 5/08* (2006.01)
  *G06F 3/041* (2006.01)

(52) U.S. Cl.
  USPC .......................... 345/163; 345/167; 345/173

(58) Field of Classification Search
  USPC ................. 345/163–173; D14/402; 361/679.01–679.39
  See application file for complete search history.

(56) References Cited

U.S. PATENT DOCUMENTS

| | | | | |
|---|---|---|---|---|
| 6,040,820 | A * | 3/2000 | Choi | 345/156 |
| 7,768,500 | B2 * | 8/2010 | Saez et al. | 345/163 |
| 7,796,118 | B2 * | 9/2010 | Groom et al. | 345/163 |
| 2002/0126095 | A1 * | 9/2002 | Cheng et al. | 345/167 |
| 2004/0211601 | A1 * | 10/2004 | Allan | 178/18.01 |
| 2006/0132447 | A1 * | 6/2006 | Conrad | 345/168 |
| 2007/0200824 | A1 * | 8/2007 | Choo | 345/163 |
| 2007/0268252 | A1 * | 11/2007 | Chiang et al. | 345/163 |
| 2008/0218478 | A1 * | 9/2008 | Cheng et al. | 345/163 |
| 2009/0027340 | A1 * | 1/2009 | Huang et al. | 345/163 |
| 2009/0201248 | A1 * | 8/2009 | Negulescu et al. | 345/157 |
| 2010/0127980 | A1 * | 5/2010 | Lou et al. | 345/163 |
| 2010/0302190 | A1 * | 12/2010 | Yeh | 345/173 |
| 2011/0069009 | A1 * | 3/2011 | Lau | 345/166 |
| 2011/0109552 | A1 * | 5/2011 | Yasutake | 345/163 |
| 2011/0148816 | A1 * | 6/2011 | Jhu et al. | 345/175 |
| 2012/0050163 | A1 * | 3/2012 | Shih et al. | 345/163 |
| 2012/0086641 | A1 * | 4/2012 | Chien et al. | 345/166 |
| 2012/0176318 | A1 * | 7/2012 | Huang | 345/163 |

FOREIGN PATENT DOCUMENTS

| | | |
|---|---|---|
| TW | M326757 | 2/2008 |
| TW | M329206 | 3/2008 |
| TW | 200842670 | 11/2008 |
| TW | M356176 | 5/2009 |
| TW | M361061 | 7/2009 |

* cited by examiner

*Primary Examiner* — Dwayne Bost
*Assistant Examiner* — Scott Trandai
(74) *Attorney, Agent, or Firm* — Chun-Ming Shih

(57) ABSTRACT

A computer input device, capable of operating in a mouse mode and in a touch mode, includes a body, a control unit and a switch. The body includes a first housing, a second housing and a hinge interconnecting the first and second housings. The body is movable between a flat position where the first and second housings are positioned side by side in a line, and an inverted-V position where the first and second housings co-define an included angle. The control unit provides a first input function which enables the input device to operate in the mouse mode and a second input function which enables the input device to operate in the touch mode. The switch is configured to have the control unit perform the first input function when the body is in the flat position and perform the second input function when the body is in the inverted-V position.

5 Claims, 2 Drawing Sheets

COMBINATION MOUSE AND TOUCH INPUT DEVICE

BACKGROUND OF INVENTION

1. Field of Invention

The present invention relates generally to a computer input device, and more particularly to a computer input device which can be used as a mouse and a touch input device.

2. Related Prior Art

Touch technology is widely used in electronic devices. Taiwan Pat. Nos. M361061, M356176, M326757 and Taiwan Pub. No. 200842670 are exemplary of patents directed to computer mice of the type where at least one touch pad is employed.

Specifically, Taiwan Pub. No. 200842670 is directed to a computer input device which includes a body and a control mechanism situated on a side edge of the body. The control mechanism is employed with a mouse function on one side and a touch function on the other side. Besides, the control mechanism is able to rotate about an axis, which is vertical to the side edge of the body, with respect to the body to present either the side or the other side on top. When the control mechanism has its mouse-function side on top and be flush with a top surface of the body, the input device serves as a mouse. On the contrary, when the control mechanism is rotated 180 degrees about the axis with respect to the body to have its touch-function side on top and be flush with the top surface of the body, the input device serves as a touch input device. In any case, the computer input device of that patent can function, either in mouse mode or in touch mode, only when the body and the control mechanism are arranged in a flat position. Considering the ergonomics, the flat configuration renders the computer input device unfit for a mouse.

To be an ergonomic design, a foldable mouse as described in Taiwan Pat. No. M329206 includes a mouse body, a support portion and a pivoting structure to connect the mouse body and the support portion. The mouse body defines a cavity in a side thereof to receive the support portion when the mouse is folded. On the other hand, when the support portion is withdrawn from the cavity and turned away from the mouse body, the mouse as a whole appears in an inverted-V position and fits comfortably within a user's palm. However, the mouse itself performs only one job, namely the mouse function, no matter it is in the original position or the inverted-V position.

Additionally, U.S. Pat. No. 6,040,820 is directed to an input device used as a track ball mouse and a ball mouse. The input device includes a first housing and a second housing hinged to the first housing. A track ball is mounted on the first housing. When the first and second housing are folded upon one another, the input device serves as a track ball mouse which allows fingers to rotate the track ball in order to control cursor on a screen. When the first and second housing are unfolded in a flat position, the track ball is turned upside-down to contact the desk and the input device serves as a ball mouse.

SUMMARY OF INVENTION

The present invention provides a computer input device which integrates functions of a touch pad and a mouse. The computer input device generally includes a body, a control unit and a switch. The body includes a first housing, a second housing and a hinge rotatably connecting the first housing and the second housing. The body is movable between a flat position where the first and second housings are positioned side by side in a line, and an inverted-V position where the first and second housings co-define an included angle therebetween. The control unit is disposed in the body and constructed to provide a first input function which enables the input device to operate in a mouse mode and a second input function which enables the input device to operate in a touch mode. The switch is disposed in the body, coupled to the control unit, and especially configured to have the control unit perform the first input function when the body is arranged in the flat position and switch the control unit to perform the second input function when the body is arranged in the inverted-V position.

The construction of input device as described above is thus far largely conventional. According to the present invention, this configuration is advantageously utilized to perform input functions in mated and ergonomic positions.

Further features and advantages of the present invention will be appreciated by review of the following detailed description of the invention.

BRIEF DESCRIPTION OF DRAWINGS

The invention is illustrated by the accompanying drawings in which corresponding parts are identified by the same numerals and in which.

DETAILED DESCRIPTION OF PREFERRED EMBODIMENT

With reference to FIGS. 1 through 4, a computer input device 1 in accordance with the preferred embodiment of the invention includes a body 2, a control unit 3 and a switch 4. The input device 1 may be selectively coupled to a computer via a wire or wireless connection so as to manipulate a cursor on a screen of the computer.

Figure 1:
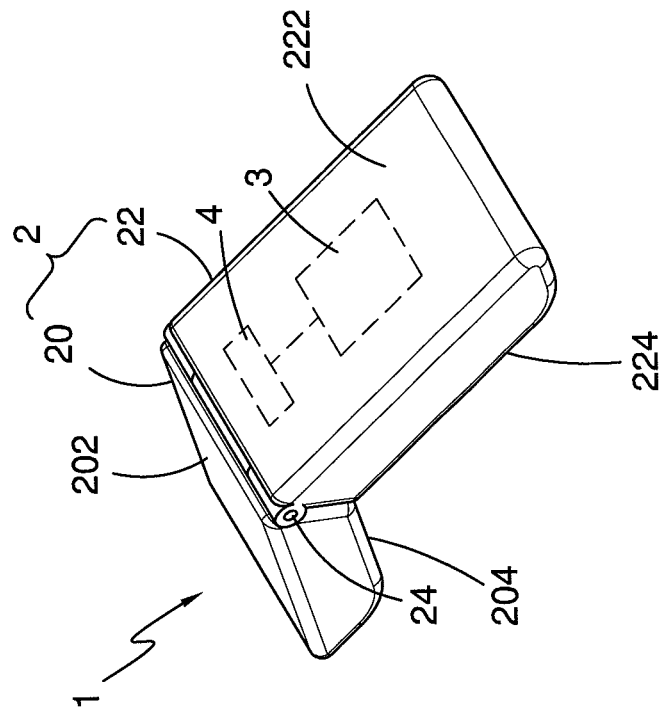
FIG. 1 is a perspective view of a computer input device, unfolded in a flat position, in accordance with the preferred embodiment of the present invention.
Figure 2:
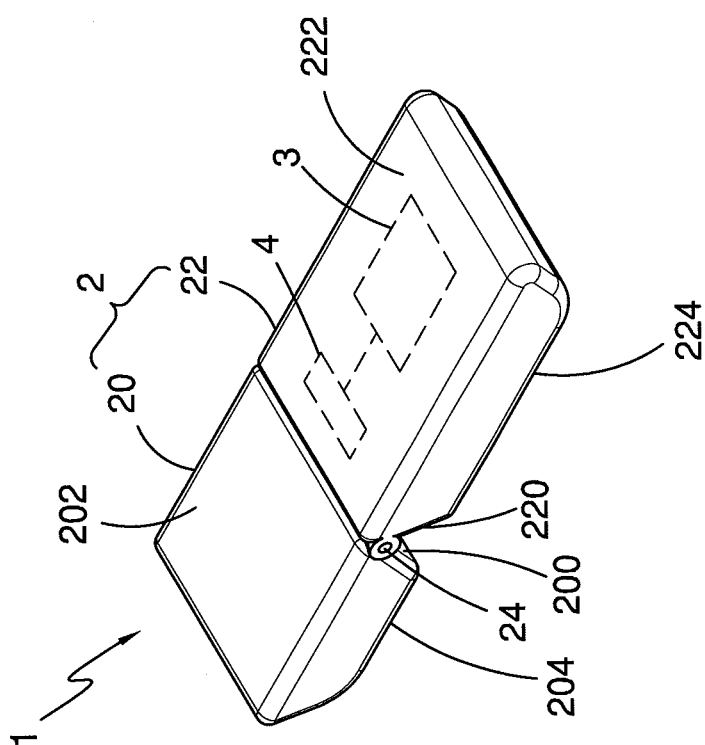
FIG. 2 is another perspective view of the computer input device of FIG. 1, showing the input device is folded in an inverted-V position.
Figure 4:
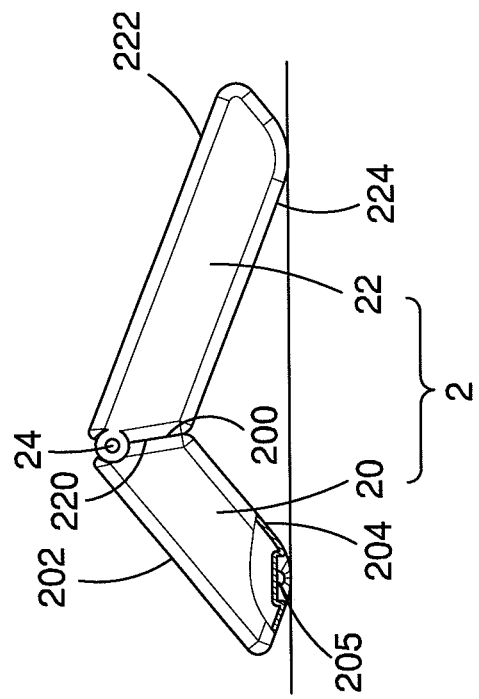
FIG. 4 is a cross section of the input device of FIG. 2 taken along its longitudinal axis.
Figure 3:
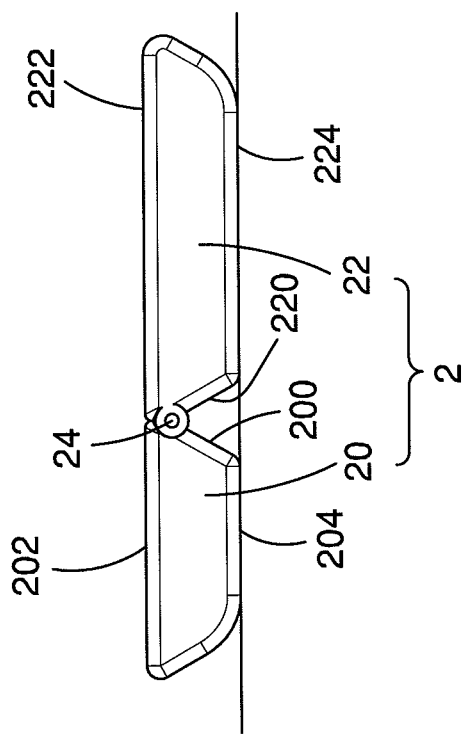
FIG. 3 is a cross section of the input device of FIG. 1 taken along its longitudinal axis.

The body 2 includes a first housing 20, a second housing 22 and a hinge 24. The first housing 20 has a top flat surface 202 and a front tilted side surface 200. The second housing 22 has a top flat surface 222 and a rear tilted side surface 220 facing the front side surface 200 of the first housing 20. The hinge 24 is located between the front side surface 200 of the first housing 20 and the rear side surface 220 of the second housing 22 and rotatably connects the first housing 20 and the second housing 22. As such, the body 2 is movable between a flat position, as depicted in FIGS. 1 and 3, and an inverted-V position, as depicted in FIGS. 2 and 4. When the body 2 is unfolded in the flat position, the first and second housings 20, 22 are positioned side by side in a line; and the top flat surface 202 of the first housing 20 is flush with that of the second housing 22. On the other hand, when the body 2 is folded in the inverted-V position, the first and second housings 20, 22 co-define an included angle therebetween, and the front tilted side surface 200 of the first housing 20 abuts against the rear tilted side surface 220 of the second housing 22 to sustain the body 2 in a stable state, as illustrated in FIGS. 2 and 4.

Referring back to FIG. 1, the control unit 3 is disposed in the second housing 22 of the body 2 and constructed to provide a first input function which enables the input device 1 to operate in a mouse mode, and a second input function which enables the input device 1 to operate in a touch mode. The switch 4 is also disposed in the second housing 22 of the body 2 and coupled to the control unit 3. The switch is configured to have the control unit 3 perform the first input function when the body 2 is arranged in the flat position and switch the control unit 3 to perform the second input function when the body 2 is arranged in the inverted-V position.

In this embodiment, the first and second housings 20, 22 are both made from touch panels, and therefore when the body 2 is in the flat position, as shown in FIGS. 1 and 3, the first and second housings 20, 22 may be integrated into one touch pad with the top flat surface 202 of the first housing 20 and the top flat surface 222 of the second housing 22 lying in the same plane. Moreover, the input device 1 employs single touch or multi-touch functions while used in the touch mode.

FIGS. 2 and 4 illustrate that the input device 1 is in the inverted-V position where the control unit 5 performs the mouse function. A detector 205 is employed in the input device 1 to detect movement of the body 2 with respect to a desk. The detector 205 may be a roller detector or an optical detector (such as a LED or laser). The control unit 3 is able to receive detected position information from the detector 205 and then transfer to the computer for control of the cursor. Furthermore, the top flat surface 202 of the first housing 20 may be formed with two button area serving as a left button and a right button of a traditional mouse. As such, the whole input device 1 is similar to a conventional mouse and can be used in the mouse mode. It is noted that when the input device 1 is in the mouse mode, the top flat surfaces of the first and second housings 20, 22 may also provide the multi-touch functions. It is also noted that the control unit 3 and the switch 4 are both located in the second housing 22, as shown in FIG. 1; however, in another example, the control unit 3 and the switch 4 may both be disposed in the first housing 20 or separately arranged in the first and second housings 20, 22.

As shown in FIGS. 1 and 3, the hinge 3 is arranged along a lateral direction such that the first and second housings 20, 22 can be easily rotated about the hinge relative to each other to have the whole body 2 unfolded in the flat position or folded in the inverted-V position. Preferably, the first and second housings 20, 22 share the same width while the first housing 20 has a length smaller than that of the second housing the first housing 20 such that the body 1 may comfortably fit into a palm of hand of a user when in the inverted-V position.

It will be appreciated that although a particular embodiment of the invention has been shown and described, modifications may be made. It is intended in the claims to cover such modifications which come within the spirit and scope of the invention.

The invention claimed is:

1. A computer input device comprising:
a body having a first housing, a second housing and a hinge rotatably connecting the first housing and the second housing about an axis of the hinge; the first housing having a top flat surface and a front tilted side surface; the second housing having a top flat surface and a rear tilted side surface facing the front tilted side surface; the hinge being between the front tilted side surface and the rear tilted side surface and the axis direction of the hinge being parallel to a lateral direction of the body; the body being movable between a flat position where the first and second housings are positioned side by side in a line and the front tilted side surface is away from the rear tilted side surface, and an inverted-V position where the first and second housings co-define an included angle therebetween and the front tilted side surface abuts against the rear tilted side surface;
a control unit disposed in the body and constructed to provide a first input function which enables the input device to operate in a mouse mode and a second input function which enables the input device to operate in a touch mode; and
a switch disposed in the body and coupled to the control unit; the switch being configured to have the control unit perform the first input function when the body is arranged in the flat position and switch the control unit to perform the second input function when the body is arranged in the inverted-V position.

2. The computer input device of claim 1, wherein when the first and second housings are arranged side by side in the flat manner, the top flat surface of the first housing is flush with that of the second housing.

3. The computer input device of claim 1, wherein the top flat surface of the first and second housings are touch panels.

4. The computer input device of claim 1 further comprising a detector in the first housing or the second housing, wherein when the first and second housings are arranged in the inverted-V position, the detector detects movement of the body with respect to a surface of an article.

5. The computer input device of claim 1, wherein the second housing is foldable relative to first housing about the axis of the hinge.

* * * * *